United States Patent [19]

Leduc et al.

[11] Patent Number: 4,790,755
[45] Date of Patent: Dec. 13, 1988

[54] AIRCRAFT PILOT-TRAINING APPARATUS

[76] Inventors: René Leduc; Michèle Leduc, both of B.P. 120 - Place Fodère, St-Jean-de-Maurienne, France

[21] Appl. No.: 18,810
[22] PCT Filed: Jun. 26, 1986
[86] PCT No.: PCT/FR86/00225
 § 371 Date: Feb. 20, 1987
 § 102(e) Date: Feb. 20, 1987
[87] PCT Pub. No.: WO87/00141
 PCT Pub. Date: Jan. 15, 1987

[30] Foreign Application Priority Data
 Jul. 2, 1985 [FR] France .................. 8510196

[51] Int. Cl.⁴ .............................. B64F 3/00
[52] U.S. Cl. .................. 434/37; 434/55; 434/56; 244/115; 244/63; 244/1 R; 272/28 S; 272/31 A; 272/40
[58] Field of Search .......... 244/63, 1 R, 114 R, 244/110 F; 272/28 S, 31 A, 31 B, 39, 40; 434/37, 55, 56

[56] References Cited
U.S. PATENT DOCUMENTS

| | | | |
|---|---|---|---|
| 1,383,595 | 7/1921 | Black . | |
| 1,737,483 | 11/1929 | Verret . | |
| 1,748,663 | 2/1930 | Tucker . | |
| 1,842,432 | 1/1932 | Stanton . | |
| 1,912,174 | 5/1933 | Biscl | 434/55 |
| 2,031,310 | 2/1936 | Hall | 434/56 |
| 2,094,397 | 9/1937 | Cortes | 434/55 |
| 2,142,169 | 1/1939 | Biscl | 434/55 |
| 2,286,381 | 6/1942 | Rubissow . | |
| 2,362,190 | 11/1944 | Cortes | 434/55 |
| 4,253,579 | 3/1981 | Williams . | |

FOREIGN PATENT DOCUMENTS 747424 6/1933 France .
509161 9/1939 United Kingdom .

Primary Examiner—Galen Barefoot
Attorney, Agent, or Firm—Bacon & Thomas

[57] ABSTRACT

An apparatus for training aircraft pilots wherein the apparatus includes a boom defined by a central bracket, a large rigid arm and a small rigid arm collectively supported on a vertical mast for pivotal movement about horizontal and vertical axes. The large and small arms extending outwardly from the mast along a common longitudinal axis, the outward end of the small arm being provided with an adjustable balance weight and the outward end of the big arm being provided with a sling for suspending an aircraft at its center of gravity.

9 Claims, 2 Drawing Sheets

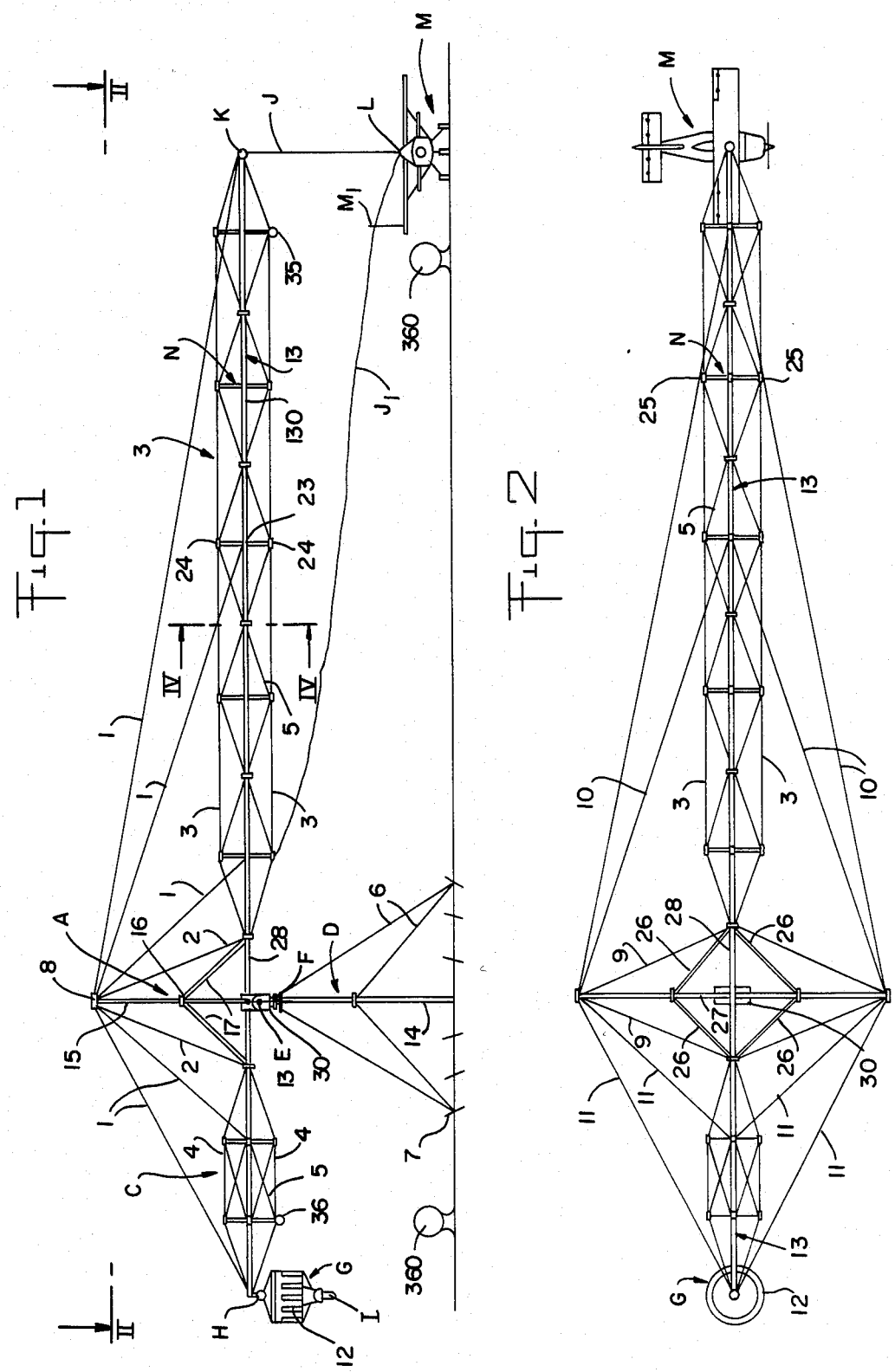

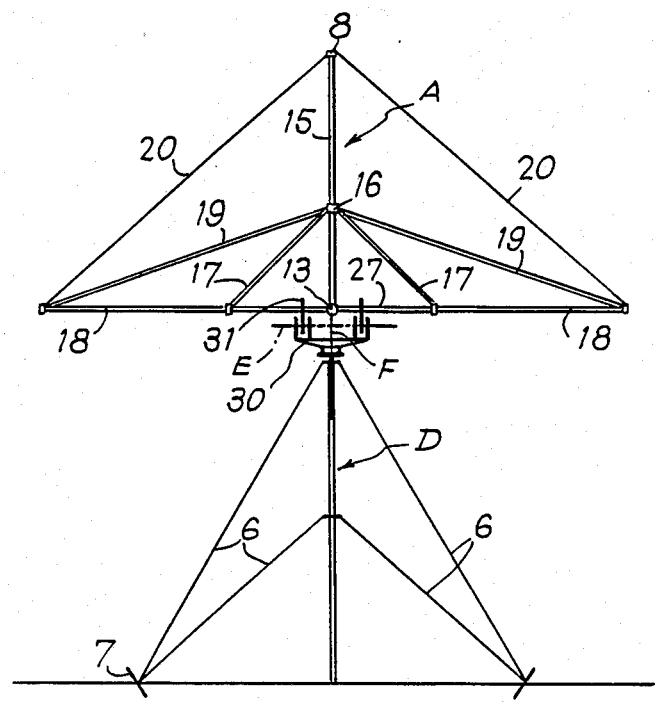
Fig. 3
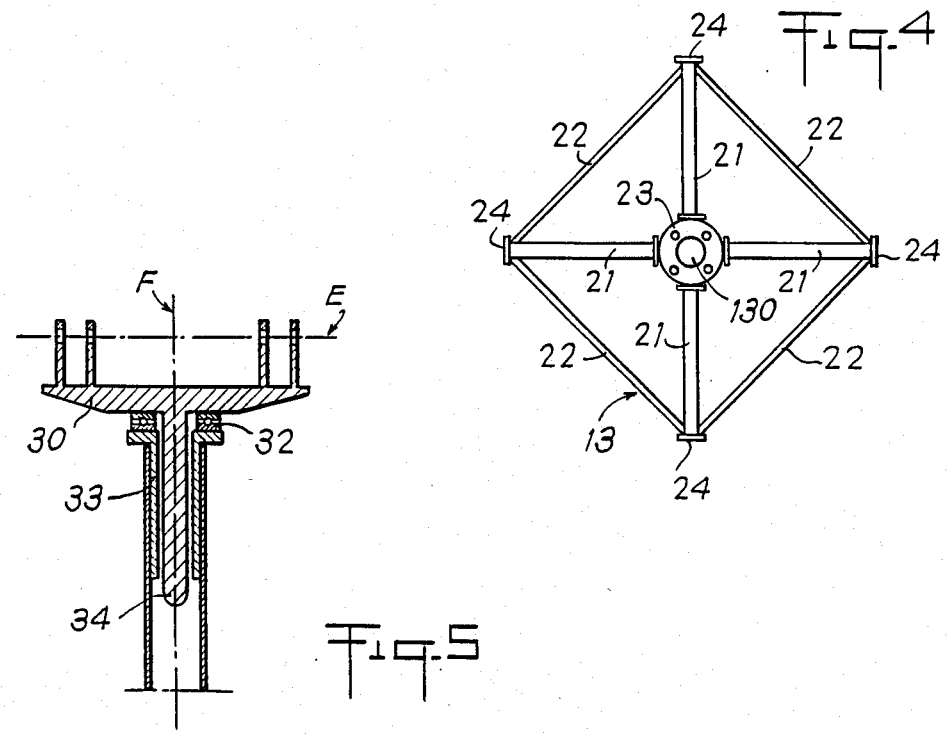
Fig. 4
Fig. 5

AIRCRAFT PILOT-TRAINING APPARATUS

TECHNICAL FIELD

The present invention relates to training equipment and in particular to aircraft pilot-training equipments.

The apparatus according to the invention is more particularly intended, among other uses, for training aircraft pilots.

The apparatus according to the invention is used, especially, for teaching trainee-pilots, from a captive aircraft, the techniques of take-off and landing. These manoeuvers are the most difficult ones to learn, in particular landing, which requires from the pilot an accurate judgement of distances and a good coordination of the controls, in order to reduce the risks of accidents to a minimum.

PRIOR ART

The first method known for that training has involved the use of training planes. This method however, is an extremely expensive one as it necessitates the use of a conventional aircraft, flying in the normal way, and offering on every flight only one take-off and one landing possibility.

Yet, as we know, the most difficult part of the training is to learn how to land.

Considering the risks attached, it is not really possible with that method to place the trainee in difficult flying conditions, such as for example, piloting an aircraft with an off-centered load or landing under heavy crosswinds.

Various other methods have been proposed to overcome this problem.

One of these is the electronical or mechanical flight simulator, but the equipment is very expensive and, anyway, it only simulates the flight of an aircraft, and the trainee-pilot knows that he is not really flying and therefore cannot have the true sensation of flying.

Another method has been to integrate the aircraft to a movable carrying structure. This is described for example in French Pat. No. 747 424 which proposes to adapt an aircraft on the end of a boom, mounted for pivoting via a vertical axis on a pivotable head supported by a vertical supporting structure. Beyond the vertical axis, the boom forms a small arm which is connected with means for controlling its pivoting movement. In general, for reasons of static and dynamic constructional balance, the head comprises two diametrically-opposite booms.

The advantage of such a structure is that the phases of take-off and landing can be increased at discretion. Yet there are also certain disadvantages which are that the structure, beside being complex, offers no possibility for the aircraft to move on its own three axes, namely on its pitch, roll and yaw axes. It is also impossible with that structure to modify the relative mass of the aircraft in such a way as to simulate real conditions of stable flying at low speeds, in order to help the training phases.

Moreover, the conditions of flying in altitude are entirely dependent on how the mechanism controlling the pivoting movement of the boom works, this mechanism requiring, in order to be actuated from inside the aircraft, a remote-control structure which is particularly complex, delicate and expensive.

Another similar type method is described in British Pat. No. 509 161 which presents exactly the same disadvantages as those found with French Pat. No. 747 424.

SUMMARY OF THE INVENTION

It is the object of the present invention to overcome said disadvantages by enabling the trainee-pilot to fly in the air as in the reality, while piloting an aircraft which is captive yet free on its three axes, both on the ground and in the air.

The invention proposes to this effect an apparatus with the added possibility of modifying at will the relative mass of the aircraft, in order to create different conditions of rolling, take-off, flying and landing, all with the same aircraft, and with the same engine power characteristics.

A further object of the invention is to propose an apparatus which is really secure for flying at limited altitude.

These objects are reached according to the invention with an apparatus which comprises:

on the one hand, and attached to the small arm of the boom, a balance weight provided at its base with rolling and stop means for contact with the ground and for limiting the pivoting amplitude of the boom on the horizontal axis, in the big arm raising direction, and on the other hand, and attached to the big arm of the boom means for suspending an aircraft substantially by its center of gravity, said means including two universal joints situated close to the arm and to the aircraft, respectively.

The object of the invention consists essentially in a big rigid boom positioned at about one fifth of its length on a supporting mast, thus creating a big arm and a small arm. Said big boom is adapted to pivot on the top of the supporting mast about a vertical axis and a horizontal axis. The end of the big arm can thus turn in either direction, or go up or down, the pivoting point being the top of the mast, and the small arm making the reverse movements. The balance weight is suspended on the end of the small arm and can be made heavier or lighter. A sling is fastened to the end of the big arm, the length of said sling being slightly less than the height of the mast. The aircraft is suspended on the end of said sling, substantially by its center of gravity, said aircraft being pivotable in any direction with respect to the boom.

The supporting mast, which is fixed to the ground, is rigid. It can be either a large tube held vertically by stays, or a self-supporting mast, or a construction such as a concrete tower similar to a water tower with a room at the top, such as a control tower or a panoramic restaurant. At the top of the supporting mast there is provided a system of articulations for receiving the big rigid boom. The balance weight suspended on the end of the small arm is calibrated in such a way as to reduce the weight of the aircraft suspended on the other end, by nearly all its mass. Adjustment of the balance weight will however be such as to keep a mass of 20 or 30 kg so that the aircraft stays on the ground when at rest. Once the pilot is on board, the mass to be launched is only the weight of the pilot plus the weight of the fuel (if the engine is a piston or turbine engine) and that of the tare. The fact of having thus reduced considerably the wing loading of the aircraft likewise reduces the lift necessary to the ascending force of the latter which can then take off at very low speed. Gradually, the weight of the aircraft can be increased by reducing the balance-weight, in order to reach as near as possible to a real flight. The aircraft is propelled by its own means but, being lighter, the power needed is clearly less than normal. Given that the aircraft is free to move in any direction, the trainee-pilot can learn all the different operations of rolling, pitching and yawing. On the ground, the aircraft can move while deviating of several meters (depending on the height of the supporting mast and of the sling), which teaches the trainee to taxi. Despite the alignment, the aircraft is always subjected to an effect of inertia similar to the real conditions of launching into flight and landing, due to the proportional effect of inertia of the balance weight.

The aircraft rise-in-altitude movement, caused by the pivoting of the boom, is automatically limited by a wheel situated beneath the balance weight and which is designed to contact with the ground. Said wheel may also be coupled to damper means.

The apparatus according to the invention enables the trainee-pilot to manoeuver aircrafts, such as propeller-driven planes or jets, helicopters or gyrocopters, on the ground or in the air. In all cases, the aircrafts are suspended on the end of the sling by their center of gravity. In the case of a helicopter or of a gyrocopter, this is suspended above the head of the rotor by a system allowing the rotation.

It is also possible with the apparatus according to the invention to manoeuver gliders if a launcher is provided to drive the rigid boom in rotation on the vertical axis.

With the apparatus according to the invention, anyone can learn to manoeuver an aircraft at considerably less cost, for the same duration period, than in a conventional piloting school where real flying aircrafts are used. For an equally lasting training period, the present invention enables the trainee-pilot to devote much more time to learning special manoeuvers, such as for example take-off and, particularly, landing.

As an example, the apparatus according to the invention may be so built as to have a big arm of 65 meters radius and a height of 10 meters for the supporting mast, in order to define either a diameter of 130 meters, or a revolving perimeter or runway of about 400 meters.

Because of the large rotation diameter, the pilot feels no centrifugal force effect. At a speed of 25 km/hr, the aircraft will take about one minute to go round the runway and there is no impression of going round and round, since the centrifugal force effect is virtually nil.

With structural dimensions such as given above, the apparatus according to the invention enables the trainee-pilot to manoeuver an aircraft at an altitude of about 30 meters, which is sufficient to learn the taking-off and especially the landing manoeuvers, including flared landing manoeuvers.

The apparatus according to the invention also enables the trainee-pilot to take off, fly and land in any type of winds, since he operates over a circular track. It is also possible to alter the centering of the aircraft, either by moving the attachment point, or by adding in judiciously positioned loads, in order to subject the trainee to the effects of bad centering, such flying conditions being virtually impossible to recreate in a conventional piloting school without taking great risks.

The present invention therefore relates to an apparatus for manoeuvering a captive aircraft with a view to training pilots, which apparatus is inexpensive to build and to use compared with the conventional training means, and which enables the trainees for an equal flying period, to devote more time to operations such as take-off and particularly landing, as well as to the combination in flight of the three axes: roll, pitch and yaw axes, and this in complete security, in any weather conditions.

The invention will be described in more detail with reference to the accompanying drawings showing one embodiment of the apparatus.

BRIEF DESCRIPTION OF THE DRAWINGS

FIG. 1 is a side elevation of the aircraft pilot training apparatus according to the invention.

FIG. 2 is a plan view of the same apparatus taken along line II—II of FIG. 1.

FIG. 3 is a partial elevation, on a larger scale, of the central part of the same apparatus.

FIG. 4 is a cross-sectional view, on a larger scale, taken along line IV—IV of FIG. 1.

FIG. 5 is a partial elevation, on a larger scale , of the system of articulation of the boom onto the structure.

DETAILED DESCRIPTION

As illustrated in FIGS. 1 and 2, the apparatus according to the invention comprises a boom composed of a central bracket A extended, on one side, by a big rigid arm B, and on the other side, by a small rigid arm C, arms B and C being supported in various points by cables 1, all fastened to the same point 8 of the central bracket. A balance weight G is attached to the end of the small arm C, via a universal joint H which enables the balance weight to pivot in any direction. A wheel I which is directionally-adjustable and self-steerable, is fixed, with a soft damper, beneath the balance weight G. Said wheel I acts as a means of touching the ground softly and smoothly, when the boom pivots on a horizontal axis, as will be described hereinafter. Cast iron plates 12 are removably attached to the sides of the balance weight G. These plates make it possible to reduce more or less the weight of an aircraft M suspended to a sling J fastened to the big arm B via a universal joint K. The aircraft M is fixed to the sling J via a universal joint L enabling the aircraft M to pivot in any direction.

The whole assembly described in the foregoing is positioned on top of a vertical supporting structure D, such as a mast, and is pivotable about two axes, a horizontal axis E and a vertical axis F, respectively.

According to the embodiment illustrated in FIGS. 1, 2 and 3, the central bracket, which may have any composition, will preferably be constituted, as illustrated in the figures, of a main tube 15 with two crossed tubes 27 and 28 braced by tubes 26. Four tubes 17 hold the tube 15 in vertical position through joining point 16. The top of tube 15 is held in vertical position, from point 8, by cables 2 and 20. Tubes 27 are extended by tubes 18 which are cross-braced, vertically, by tubes 19 and horizontally, by cables 9.

A hinge system 31 is fixed under the bracket A, said system being adaptable in a table 30 mounted via a pivot 34 in a cage 33 supported by supporting structure D. Said table 30 is mounted, via a thrust ball bearing 32, for rotating freely about a vertical axis F.

Structure D may be a tube fixed on the ground by any means which will prevent it from moving. Said tube is held in vertical position by cables 6 stepped from the top of the mast D and fastened to stakes 7 solidly anchored on the ground. The number of cables 6 is sufficient to keep a firm hold on the mast D.

The balance weight G is a reservoir filled with water or sand, but it will preferably be filled with steel grit in order to reduce its volume for equal weight. The balance weight G is suspended on the end of the small arm C via a universal joint H which enables it to keep up a constant verticality, whatever the position, horizontal or inclined, of the small arm C. Due to the fact that this balance weight G is always vertical, the self-steerable wheel will always come into contact with the ground in good conditions. Said self-steerable wheel may be of a type commonly found on the market and be coupled to an incorporated or non-incorporated damper The mass to be conferred to the balance weight must be sufficient for the movable assembly A,B,C to be balanced, so that the balance weight G tends to descend and that, by definition, the end of the big arm B tends to rise. All around the balance weight G, the cast iron plates 12 can be readily fixed or removed. Preferably, the weight of each plate 12 should not exceed 20 kg, so that a man of average strength can handle them. Said plates are equipped with a handle for that purpose. The number of plates 12 to be positioned around the balance weight G can vary, as a function of the weight of the aircraft M fixed on the end of the sling $J_1$ and of what alleviation of that weight is needed. Preferably, said plates will be in steel or in cast iron.

As illustrated in FIGS. 1, 2 and 4, the big arm B is constituted of a plurality of elementary modules 13, each one consisting of a length of tube 130 provided at its two ends with connecting flanges 23. Said length of tube 130 carries in its transversal middle part, a cable-carrying lozenge N joined to the flanges 23 via guy ropes 5. The lozenge N is constituted by radial tubes 21 of which the ends 24 are interconnected by tubes 22.

The modules 13 are placed end to end, being joined one to the other, on the one hand, by flanges 23 and, on the other hand, by cables 3 extending between the lozenges. Some at least of the elementary modules are also suspended by cables 1 to the point 8 of bracket A. The elementary module 13 is secured, by flange 23, on the corresponding end of tube 28 of the central bracket. The resulting big arm assembly is also maintained in position by cables 10 attached to the ends of the tubes 18. The whole assembly gives an effect of triangulation which is designed to brace the big arm B.

As illustrated in FIGS. 1, 2 and 4, the small arm C is similar in design to the big arm B, except that the cables are shorter. The fastening principle applied to cables 1 and 11 is the same.

According to FIG. 1, a sling J is attached to the end of the big arm B, via a universal joint K, this allowing the sling to pivot in any direction. On the other end of said sling J, is provided a universal joint equipped with a hook L for suspending the aircraft by its center of gravity. Other supporting systems may be used instead of the sling J, using also the universal joints K and L, such as for example rigid tubes, elastic slings, or a combination of such solutions. Anchoring points 35 and 36 are provided under the big arm and under the small arm for hooking on the ends of the cables of two winches 350 and 360. Said two winches are anchored on the ground, one under point 35 and the other under point 36. This system enables the manoeuvering of the movable assembly along axis E, in order to either suspend or unhook the aircraft M, and to either position or remove the plates 12.

POSSIBLE INDUSTRIAL APPLICATION

The aircraft M may be any suitable type of aircraft. For example, it may be an aircraft which was scrapped from normal flights, but acceptable for this kind of use, or it may be a dummy plane specially designed for the present invention. The universal joint L enables the aircraft to pivot in all directions and consequently to pivot about three axes, the pitch axis, the roll axis and the yaw axis.

The apparatus according to the invention is used as follows:

By operating the winches situated under points 35 and 36, the pilot brings the balance weight G to touch the ground. He then places the number of plates 12 required for alleviating the weight of the aircraft, depending on the type of flight selected. Then he operates the winches to bring the joint L of the sling J level with the aircraft M. He fastens said sling to the aircraft and detaches the winch cables from points 35 and 36. The apparatus is ready to operate. The pilot climbs in the aircraft, starts the engine and works the controls just as for a real flight.

One considerable advantage of using the apparatus according to the invention is that it enables the pilot instructor to follow on the ground everything that the trainee-pilot does and to communicate with him by radio or even by sign language.

Obviously, numerous modifications may be brought to the apparatus described hereinabove, without departing from the scope of the invention, such as for example, to the structure of bracket A, to the arms B and C, to the assembly articulated in E and F. It is also possible to use other balance weight systems instead of G and plates 12, as well as another damping system instead of damper wheel 1. The mast D may also be replaced by a self-supporting mast or by a concrete tower. Finally, the sling J which is an essential part of the invention, can take on many other shapes and compositions: for example it can be either flexible, rigid or elastic.

The apparatus according to the invention is entirely dismountable into small ready-to-handle elements, said elements being composed of tubes, cables, lozenges, balance weight. On each end of the tubes is welded a flange provided with several holes for interconnecting the tubes.

According to FIG. 1, it is possible to connect the aircraft M to the big arm B via a second flexible sling $J_1$, which is designed to limit the rising of the aircraft under the effect of the centrifugal force. Said sling $J_1$ is attached to the arm B, close to the bracket A and to the center of gravity L of the aircraft, and its length is calculated as a function of the required rising limit. Said sling $J_1$ has an added safety function which is to double the fastening of the aircraft to the big arm B. It should be noted that sling $J_1$ passes through a guide $M_1$ which is adapted on the tip of the inner wing of the aircraft M, in the case of a plane. This particular arrangement preserves a freedom of operation on the roll axis.

Another function of the sling $J_1$ is, when it is stretched, to hold the aircraft on the axis of the runway due to the effect of the centrifugal force, such as is done for circular flying models.

The apparatus according to the invention being readily assembled, dismounted and transportable by road, it can be installed in different locations as the need arises.

We claim:

1. An apparatus for training aircraft pilots from a captive aircraft comprising:

(a) a support mast including a top end provided with an articulation means defining a vertical axis and a horizontal axis;
(b) a rigid boom mounted on the articulation means and extending outwardly therefrom for defining a small arm and a big arm;
(c) a balance weight including a top and a base, the top of the weight being attached under the small arm and the bottom of the base being provided with rolling and stopping contact means for engaging the ground and limiting the pivoting amplitude of the boom about the horizontal axis during raising of the big arm; and
(d) means carried by the big arm for suspending an aircraft at substantially its center of gravity, the suspending means including a first universal joint disposed adjacent the big arm and a second universal joint disposed adjacent the aircraft.

2. The apparatus of claim 1 wherein the articulation means permits rotation of the boom about the vertical axis by the propelling means of the aircraft.

3. The apparatus of claim 1 further including a motor for rotating the boom about the vertical axis and a glider aircraft suspended by the suspending means.

4. The apparatus of claim 1 wherein the balance weight is adjustable in mass, and further including a universal joint attaching the top of the balance weight to the small arm.

5. The apparatus of claim 4 wherein the adjustable mass is defined by a supporting structure and a plurality of ballast plates which may be selectively added to ore removed from the supporting structure.

6. The apparatus of claim 1 wherein the base of the balance weight is provided with a self-steering wheel for rolling and a damper for stopping.

7. The apparatus of claim 1 wherein the suspending means includes a sling.

8. The apparatus of claim 1 wherein the small arm and the big arm are defined by an end-to-end combination of constructional modules, each module including a length of tube provided with end flanges, a cable-carrying lozenge fixed in the transversal middle plane of the tube, and guy ropes extending between the lozenge and the two ends of the tube, with the modules being interconnected by the flanges and by cables extending between the lozenges.

9. The apparatus of claim 1 wherein the small arm and the big arm are each provided with a winch for winding or unwinding a ground anchorage cable.

* * * * *